United States Patent [19]
Murto

[11] Patent Number: 5,966,662
[45] Date of Patent: Oct. 12, 1999

[54] SUBSCRIBER PAGING CONTROL IN A MOBILE COMMUNICATION SYSTEM

[75] Inventor: Juhani Murto, Helsinki, Finland

[73] Assignee: Nokia Telecommunications Oy, Espoo, Finland

[21] Appl. No.: 08/765,513

[22] PCT Filed: Jun. 26, 1995

[86] PCT No.: PCT/FI95/00369

§ 371 Date: Dec. 27, 1996

§ 102(e) Date: Dec. 27, 1996

[87] PCT Pub. No.: WO96/01030

PCT Pub. Date: Jan. 11, 1996

[30] Foreign Application Priority Data

Jun. 28, 1994 [FI] Finland ..................... 943104

[51] Int. Cl.⁶ ............................... H04B 1/00
[52] U.S. Cl. ................ 455/458; 455/453; 455/31.1
[58] Field of Search ..................... 455/453, 452, 455/458, 432, 435, 445, 512, 513, 514, 31.1, 31.2, 31.3

[56] References Cited

U.S. PATENT DOCUMENTS

| | | | |
|---|---|---|---|
| 4,670,899 | 6/1987 | Brody et al. | 455/453 |
| 5,241,685 | 8/1993 | Bodin et al. | 455/458 |
| 5,301,356 | 4/1994 | Bodin et al. | 455/512 |
| 5,448,761 | 9/1995 | Ushirokawa | 455/452 |
| 5,479,481 | 12/1995 | Koivunen | 379/59 |
| 5,507,034 | 4/1996 | Bodin et al. | 455/513 |

FOREIGN PATENT DOCUMENTS 454 648  10/1991  European Pat. Off. .

OTHER PUBLICATIONS

British Telecom Technology Journal, vol. 9, No. 4, 1991, S T S Chia, "Location Registration and Paging in a Third Generation Mobile System" pp. 61–68.

International Switching symposium, 1992 "Diversification and Integration of Networks and Switching Technologies Towards the 21st. Century" Yokohama,Japan. Oct. 25–30, 1992 Proceeding vol. 1, pp. 307–311.

IEEE Transaction on Vehicular Technology, vol. 44,No. 3,Aug. 1995,George L Lyberopoulos et al "Intelligent Paging strategies for Third Generation Mobile Telecommunication Systems". Abstraxt pp. 543–554.

*Primary Examiner*—Edward F. Urban
*Assistant Examiner*—Thuan T. Nguyen
*Attorney, Agent, or Firm*—IP Group of Pillsbury Madison & Sutro LLP

[57] ABSTRACT

A mobile communication system and a method controls subscriber paging messages in a mobile communication system. The base stations of a mobile communication system are arranged according to their traffic load into paging groups with different priorities, so that base stations with a traffic load level lower than a predetermined threshold value have a higher priority in the selection of base stations for transmitting a paging message than base stations with a traffic load level higher than the threshold value. A paging message for a mobile station is first transmitted via the lightly loaded base stations of the location area of the mobile station.

11 Claims, 7 Drawing Sheets

SUBSCRIBER PAGING CONTROL IN A MOBILE COMMUNICATION SYSTEM

This application is the national phase of international application PCT/FI95/00369, filed Jun. 26, 1995 which designated the U.S.

FIELD OF THE INVENTION

The invention relates to a mobile communication system and a method for controlling subscriber paging messages in a mobile communication system comprising mobile stations, base stations, a mobile services switching centre and a subscriber database maintaining information about the location of mobile stations.

BACKGROUND OF THE INVENTION

The geographical area covered by a mobile communication system is divided into small radio cells in order to improve the utilization of frequencies. While in a cell, a mobile station communicates with the fixed network via the base station of the cell. Mobile stations can move freely from one cell to another within the system. An example of such a system is the digital mobile telephone system GSM. A mobile station is informed of incoming calls by transmitting via the cell base station a paging message to which the mobile station should respond. Since it is not reasonable to transmit the paging message via all the base stations of the entire system, the fixed network should know the location of the mobile station within a relatively small area. The fixed network typically knows the location of a mobile station within a larger area, generally called a location area, consisting of one or several cells. When the mobile station moves to a new location area, it is registered as a visiting subscriber in the subscriber database of the location area, i.e. in a visitor location register, and registration is simultaneously cancelled in the visitor location register of the previous location area. Furthermore, a mobile communication network usually comprises at least one centralized subscriber database, i.e. a home location register, which stores subscriber data permanently. When a new mobile station is registered in a visitor location register, the subscriber data concerning the subscriber of this mobile station is requested from the home location register, and the subscriber location data in the home location register is simultaneously updated, this data being maintained with an accuracy of a visitor location register. A visitor location register is usually integrated with a mobile services switching centre and it controls several location areas.

When the location of a mobile station is only known with an accuracy of a location area, the mobile station must be paged through all radio cells of the location area in order to establish an incoming call.

A basic problem of radio network planning is how to design base station equipment to correspond to the expected amount of telephone traffic within an area. The average amount of traffic in an area correlates to the average subscriber mobility and density in the same area. However, there may be great variation in the temporary subscriber mobility and subscriber distribution of an area depending on the time of the day.

Due to subscriber mobility, momentary overloading situations may arise at specific base stations, whereupon new calls cannot be established via these base stations. However, there may be base stations with a sufficient amount of free capacity in the same location area. In such a case, paging messages transmitted via overloaded base stations cause unnecessary signalling traffic between a base station and a mobile station in a situation where the base station cannot handle call establishment due to a lack of resources.

SUMMARY OF THE INVENTION

An object of the present invention is to prevent the unnecessary signalling traffic, caused by paging messages, between a base station and a mobile station in a situation where the base station cannot handle call establishment due to inadequate channel resources.

This is achieved with the method according to the invention for controlling subscriber paging messages in a mobile communication system, the method being characterized by grouping the base stations of a location area according to their traffic load, transmitting a paging message for a mobile station first via the lightly loaded base stations of the location area of the mobile station.

The invention also relates to a mobile communication system that is characterized in that the base stations of the system are arranged according to their traffic load into paging groups with different priorities, so that base stations with a traffic load level lower than a predetermined threshold value have a higher priority in the selection of base stations for transmitting a paging message than base stations with a traffic load level higher than said threshold value.

In the invention, base stations of a location area are divided into paging groups according to their traffic load. The principle is that new paging messages are first transmitted through those base stations having light traffic load. It is thereby possible to immediately serve mobile stations that do not overload the system. If a mobile station does not respond to a paging message transmitted via the lightly loaded base stations, the paging message may be transmitted via the heavily loaded base stations of the location area, or the paging message may be placed in a queue to wait for resources to be released at the overloaded base stations.

The invention facilitates the prevention of unnecessary signalling traffic between a base station and a mobile station in a situation where the base station cannot handle call establishment due to a lack of resources.

BRIEF DESCRIPTION OF THE DRAWINGS

In the following, the invention will be described in greater detail by means of preferred embodiments with reference to the accompanying drawing, in which.

PREFERRED EMBODIMENTS OF THE INVENTION

The present invention can be applied in any mobile communication system which utilizes location areas or the like and in which paging areas are integrated with location areas. In the following, the invention will be illustrated by means of the Pan-European digital mobile communication system GSM (Global System For Mobile Communications). The structure and operation of the GSM system are described in greater detail in the GSM recommendations and in The *GSM System For Mobile Communications* (by M. Mouly and M. Pautet, Palaiseau, France, ISBN: 2-9507190-7).

Figure 3:
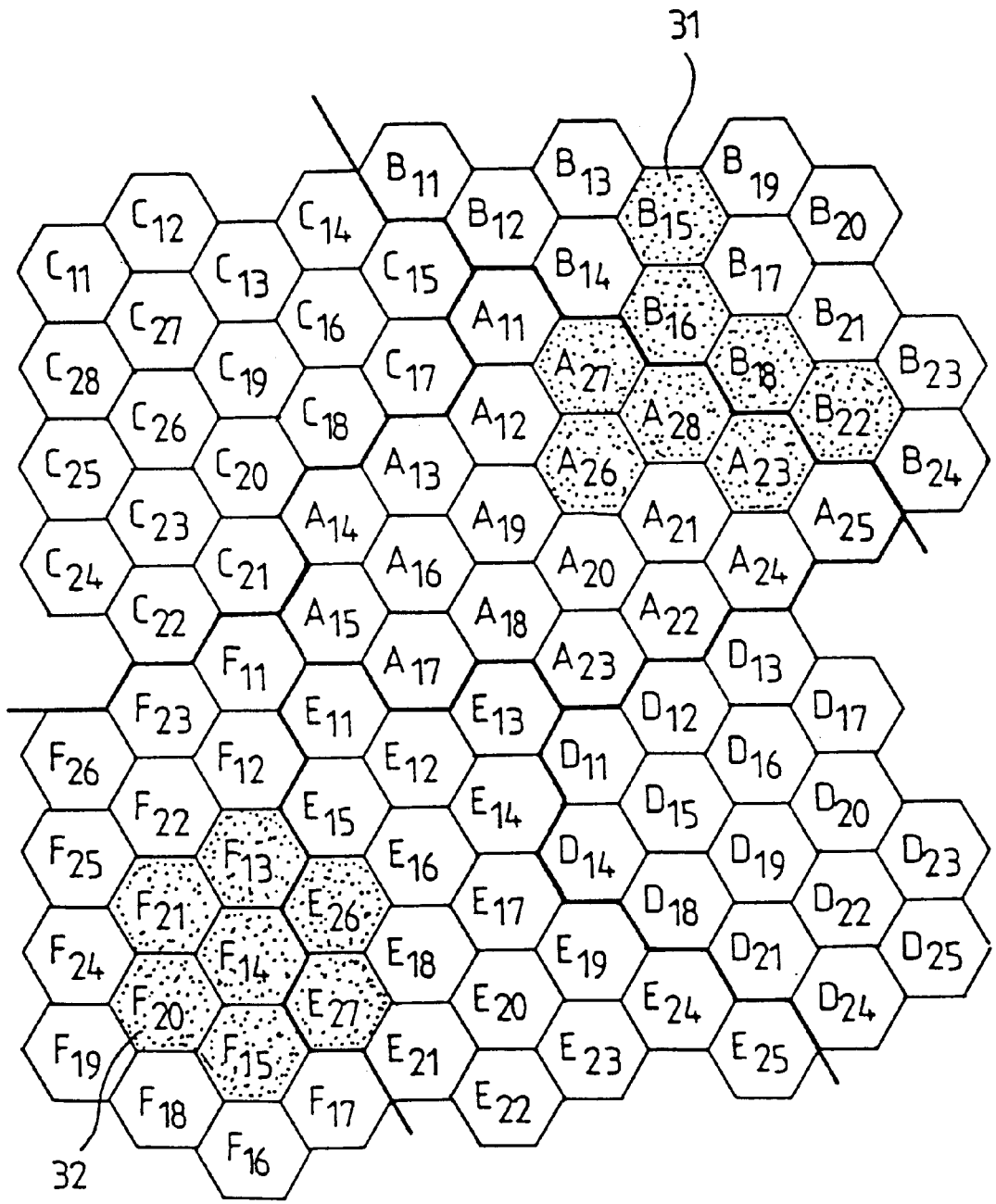
FIG. 3 illustrates the division of a radio network into location areas, radio cells and paging groups.

Some of the basic concepts and elements of the GSM system, useful in describing and in understanding the present invention, are defined below with reference to FIG. 1. The area where GSM mobile services can be used is called a GSM network. A GSM network may comprise one or several MSC areas, the MSC area referring to an area serviced by one mobile services switching centre MSC. An MSC area of the GSM network, in turn, comprises a plurality of location areas, each of which consists of one or several radio cells. A cell is the smallest geographical area in the system. A number of traffic channels are allocated to each base station BTS. FIG. 3 illustrates a part of a cellular radio system, divided into location areas A, B, C, D, E and F by thick unbroken lines. Each location area A to F, in turn, consists of a number of radio cells $A_{11}$ to $A_{29}$, $B_{11}$ to $B_{24}$, $C_{11}$ to $C_{28}$, $D_{11}$ to $D_{25}$, $E_{11}$ to $E_{27}$ and $F_{11}$ to $F_{26}$.

A GSM network generally comprises one home location register HLR, which is a database where data, such as location data, concerning a mobile station is permanently stored. The system also comprises several visitor location registers VLR. A visitor location register VLR is a database which stores the information about a mobile station for the time the mobile station visits the area of the VLR. The VLR knows the location of the mobile station MS with an accuracy of one location area. The HLR knows which VLR the mobile station MS visits, and it provides calls terminating at the mobile station MS with routing information to the correct mobile services switching centre MSC. The HLR obtains the required routing information from the VLR.

Figure 1:
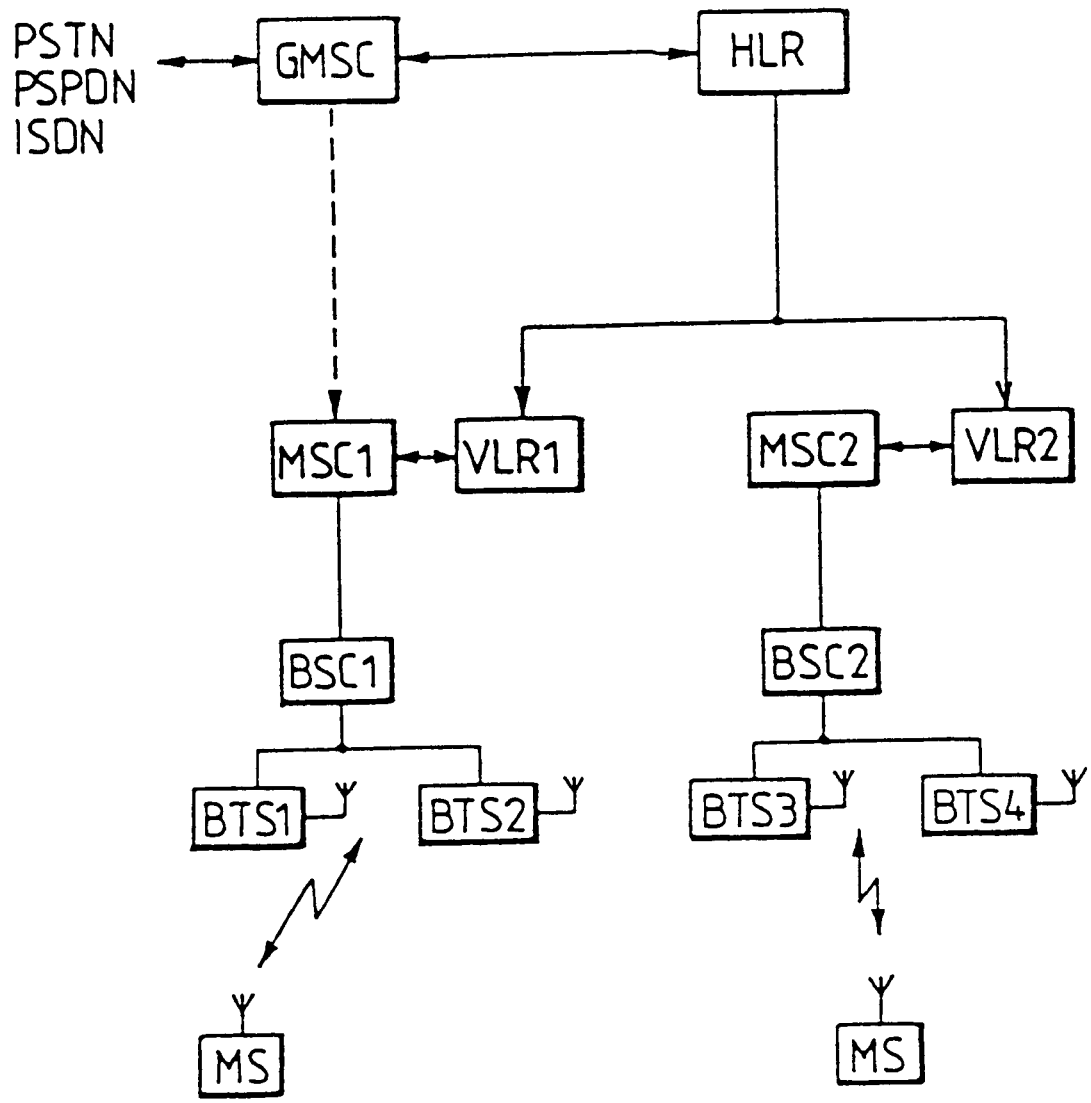
FIG. 1 illustrates a mobile communication system according to the invention.

FIG. 1 illustrates two MSC areas, one of which comprises a mobile services switching centre MSC1 and a visitor location register VLR1, and the other one comprises a mobile services switching centre MSC2 and a visitor location register VLR2. Each centre MSC covers one or several base station systems. Each base station system comprises a base station controller BSC, which controls several base stations BTS. FIG. 1 shows base station controller BSC1, which controls base stations BTS1 and BTS2, and base station controller BSC2, which controls base stations BTS3 and BTS4. Each base station communicates via a bidirectional radio connection with mobile stations MS located in the corresponding cell.

Figure 2:
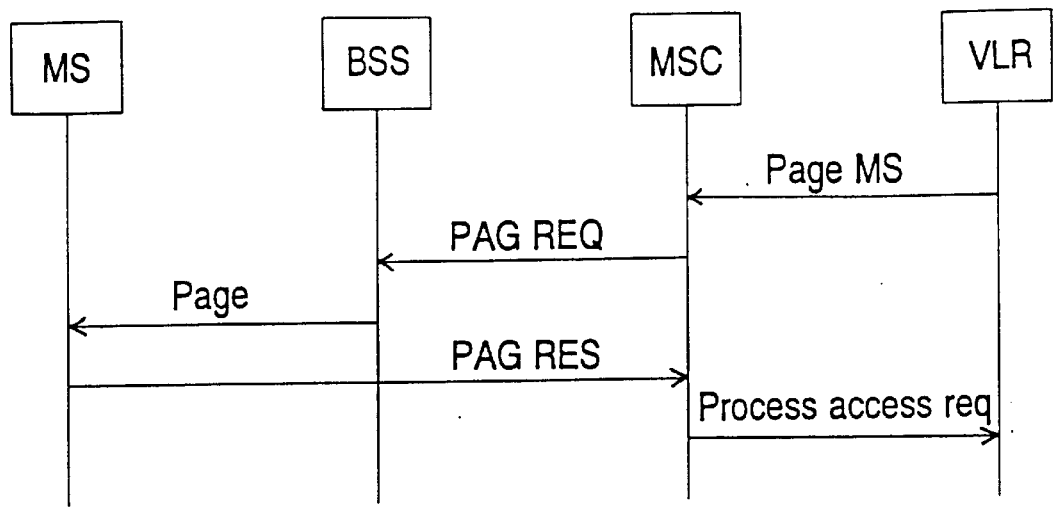
FIG. 2 is a signalling chart illustrating a prior art call establishment process.

FIG. 2 shows a signalling chart wherein a call intended for a mobile station MS is established according to the GSM recommendations. Assume first that the mobile services switching centre MSC has received a call for the mobile station MS and has performed the interrogation according to the GSM recommendation to the corresponding visitor location register VLR integrated with it. The VLR starts paging the mobile station by providing the MSC with a paging command PAGE MS that contains at least the identifier of the mobile station and the location area information. The MSC starts paging the mobile station MS on the radio path by transmitting the message PAG REQ to the base station system BSS. This message contains at least the identifier of the mobile station and a list of the identifiers of the cells/base stations in which the paging message must be transmitted. In other words, the list contains all the base stations of the location area provided by the VLR. The base station controller BSC of the base station system BSS transmits a radio-frequency paging message PAGE via the base stations BTS on the list. The mobile station MS responds by transmitting the message PAG RES, which is forwarded via the base station BTS and the base station controller BSC to the mobile services switching centre MSC, which in turn initiates call establishment by transmitting a process access request to the visitor location register VLR. According to the GSM recommendations, authentication, encryption and possible other procedures concerning subscriber B are then performed, and a call is established between subscriber A and the mobile station MS.

As stated above, the paging message to the mobile station MS is transmitted via all the base stations of the location area. Since there may be great variation in the temporary subscriber mobility and subscriber distribution within a location area depending on the time of the day, momentary overloading situations may occur at certain base stations of the location area, whereupon no new calls can be established via these base stations. Therefore, transmitting paging messages through these base stations causes unnecessary signalling traffic between a base station and a mobile station, since the base station cannot complete the call establishment due to a lack of resources, i.e. free traffic channels.

According to the invention, this problem is solved by controlling the transmission of paging messages according to the load level of the base station network. The basic idea of the invention is to divide the base stations of a location area into paging groups according to the traffic load of the base stations, so that new paging messages are first transmitted via base stations with a light traffic load.

For example FIG. 3 illustrates location areas A, B, C, D, E and F. The base station network comprises in the example two overloading areas that are illustrated with the shaded areas 31 and 32. The radio network continuously monitors the traffic load of cells/base stations and divides the base stations according to their traffic load into overloaded paging groups and lightly loaded paging groups. Due to such grouping the base stations of the shaded cells in the overloaded areas 31 and 32 are classified in a lower priority paging group, whereas the other cells that are not shaded are in a higher priority paging group. Assume that a mobile station MS is located for example in location area A. The mobile services switching centre MSC then receives from the visitor location register VLR the location area identifier A and the identifier of the mobile station MS. In a conventional network the paging message would be transmitted in all cells of the location area A. In the arrangement according to the invention, the paging message to the mobile station MS is transmitted first only in those cells of the location area A that are in the higher priority paging group, i.e. in the cells that are not shaded. At first the paging message is not transmitted at all in the overloaded cells of the lower priority paging group, i.e. in the shaded cells $A_{23}$, $A_{26}$, $A_{27}$ and $A_{28}$. If the mobile station MS is located in a cell that is not shaded and it responds to the paging message, the call establishment is completed in a normal manner. If the mobile station MS is located in a shaded cell, it does not receive the paging message and therefore does not respond to it. One of several alternative call handling strategies is then initiated, as will be described below in greater detail.

A preferred embodiment of the invention will be described below with reference to FIGS. 4 to 8. FIG. 8 is a block diagram of a mobile services switching centre MSC according to the invention, the diagram showing only the components essential to the invention. The MSC of FIG. 8 comprises a digital switch 81 through which the MSC is connected to base station systems BSS, to other mobile services switching centres MSC, to the public switched telephone network PSTN, to the visitor location register VLR, etc. The switch 81 connects the calls to the mobile station MS. The operation of the MSC is controlled by a call control computer 82, which also controls the operation of the switch SW. The MSC also comprises a K register 83, which contains a threshold value K by means of which base stations are selected for different paging groups. Each BTS (N base stations) under the mobile services switching centre MSC has its own CT register $84_1$ to $84_N$, which contains the total number of traffic channels allocated to the BTS. Each BTS under the mobile services switching centre MSC also has a C counter $85_1$ to $85_N$ indicating the number of traffic channels reserved from the BTS (i.e. the traffic load). There are also a number of MS-specific paging tables $86_1$ to $86_N$ where the identifiers of BTSs through which the mobile station MS has been paged without receiving a response are stored. The call control computer 82 utilizes these registers, tables and counters according to the invention to group the BTSs and to control the transmission of paging messages, as will be described below.

Figure 4:
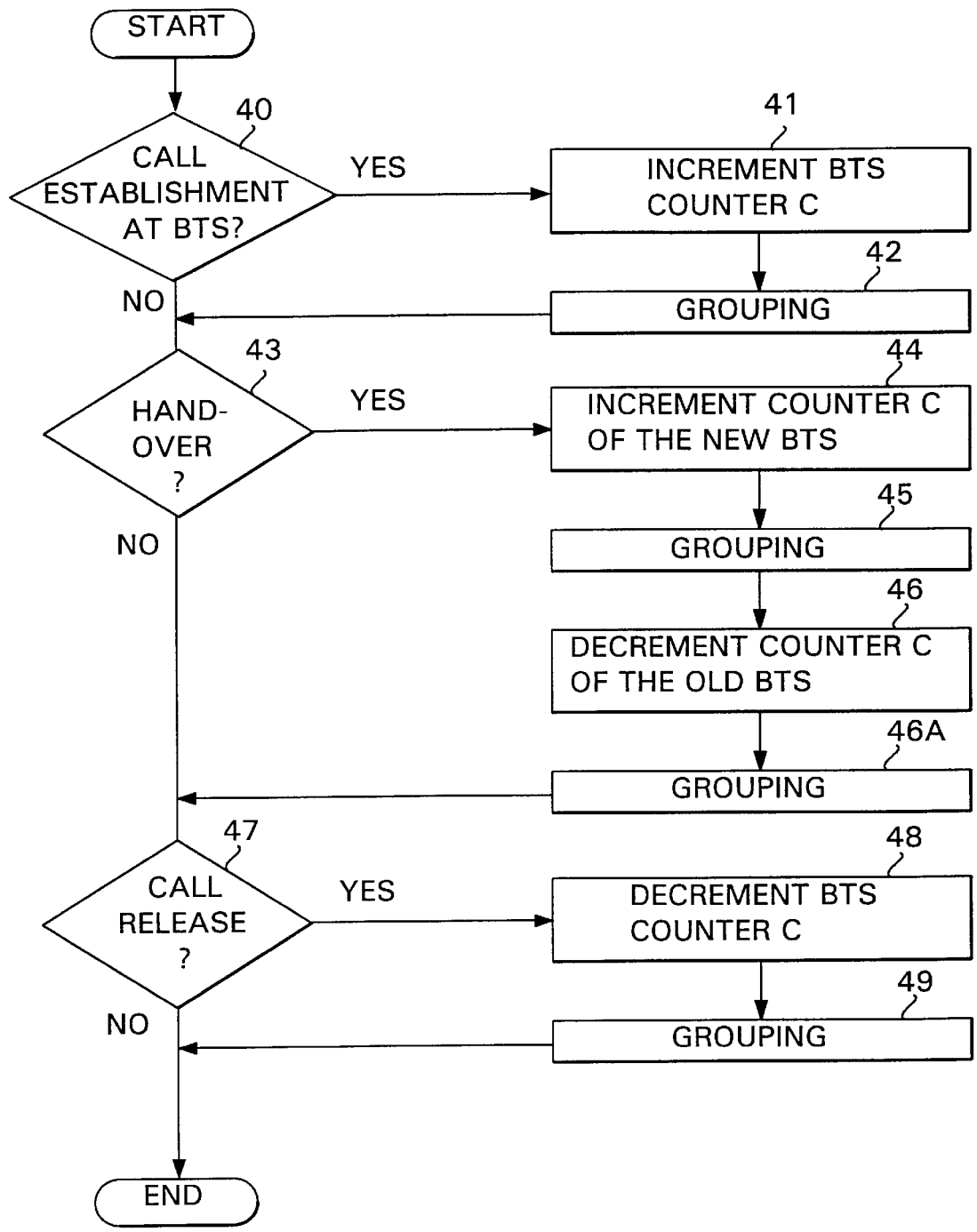
FIGS. 4 and 5 are flow charts illustrating the division of base stations according to the invention into paging groups.
Figure 5:
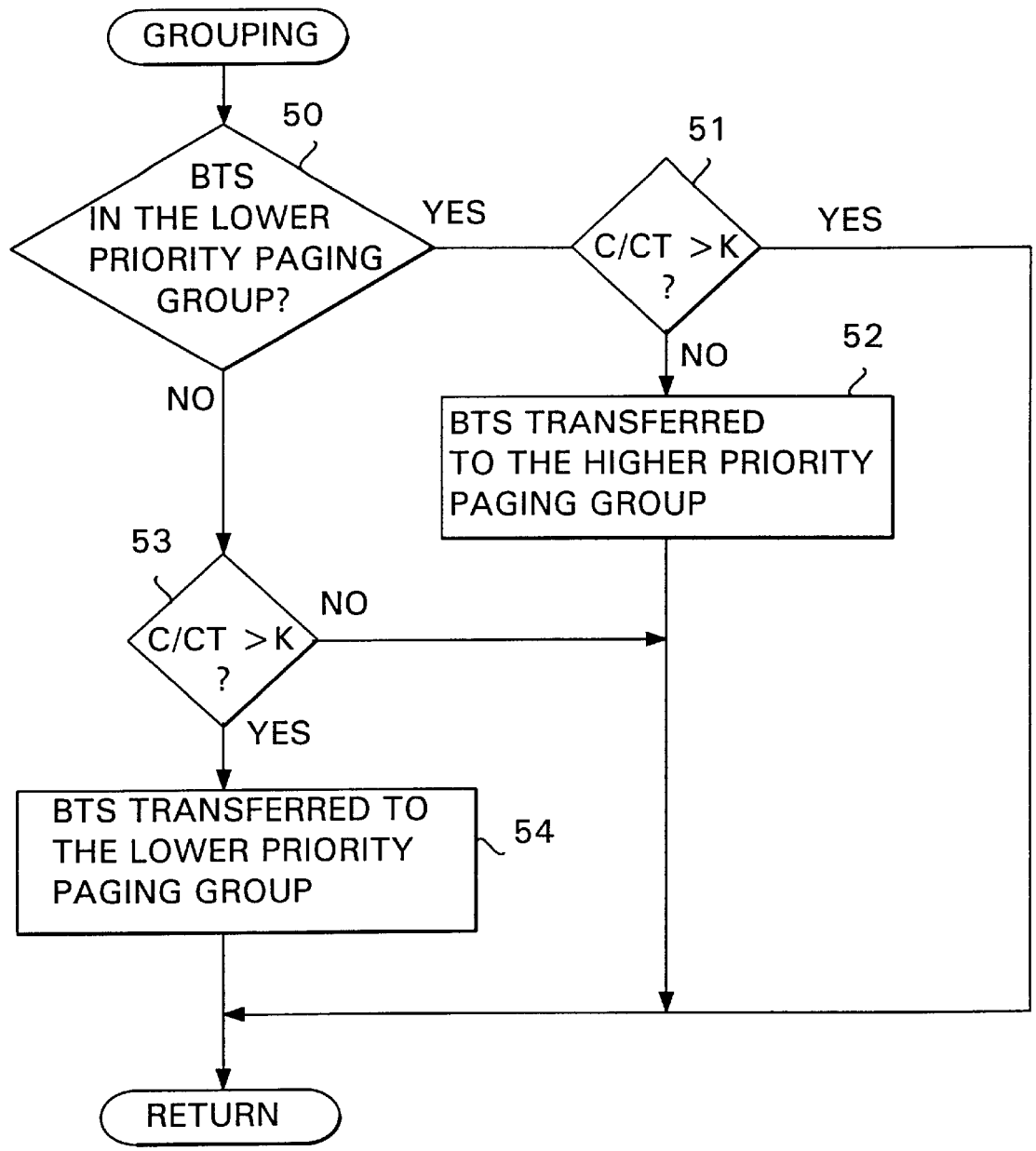

In a preferred embodiment of the invention, the mobile services switching centre MSC arranges the base stations into groups according to the traffic load in the manner shown in the block diagrams of FIGS. 4 and 5. When the radio network is in an idle state, for example when it is being set up, the registers and counters are initialized in the following manner: C counter=0, CT registers=M, K register=k. When the network is started, all BTSs are placed in the higher priority paging group since there is no traffic. When the network is in operation, the procedures according to FIGS. 4 and 5 are performed one BTS at a time, either regularly or when necessary. In step 40, it is examined whether a call is being established at a BTS. If a new call is being established at the BTS, the process proceeds to step 41 where the traffic channel counter C of the BTS is incremented with the number of traffic channels reserved by the call. The process then proceeds to step 42, where the grouping according to FIG. 5 is performed.

In step 50 of FIG. 5, it is examined whether the BTS belongs to the lower priority paging group. If it belongs thereto, the process proceeds to step 51, where it is examined whether the ratio of the content of counter C (i.e. the number of traffic channels reserved at the BTS) to the content of register CT (the total number of traffic channels allocated to the BTS) is higher than the threshold value K in the register 83. If C/CT>K, the BTS is maintained in the lower priority paging group and the process returns to FIG. 4. If C/CT≦K in step 51, the BTS is moved to the higher priority paging group (step 52), whereafter the process returns to FIG. 4. If it is noted in step 50 that the BTS does not belong to the lower but to the higher priority paging group, the process proceeds to step 53. If C/CT>K in step 53, the process proceeds to step 54, where the BTS is transferred to the lower priority paging group, whereafter the process returns to FIG. 4. If C/CT≦K in step 53, the BTS is maintained in the higher priority paging group and the process returns to FIG. 4.

In FIG. 4, the process proceeds to step 43 after the grouping 42. Correspondingly, if no call is being established at the BTS the process goes directly from step 40 on to step 43. At step 43, it is examined whether a handover occurs at the BTS during the call. If a handover is under way, the process proceeds to step 44 where the counter C of the new BTS is incremented, and the BTS is grouped in step 45. The counter C of the old BTS is then decremented in step 46, and the BTS is grouped in step 46A according to FIG. 5. After the grouping 46A, the process proceeds to step 47. Correspondingly, if it is detected in step 43 that there is no handover under way at the BTS, the process proceeds to step 47. In step 47, it is examined whether a call is being released at the BTS. If call release is in process, the counter C of the BTS is decremented in step 48, and the BTS grouping is performed in step 49 according to FIG. 5. After the grouping 49, the process moves on to the end. This also occurs if it is detected in step 47 that there is no call release under way at the BTS.

Figure 6:
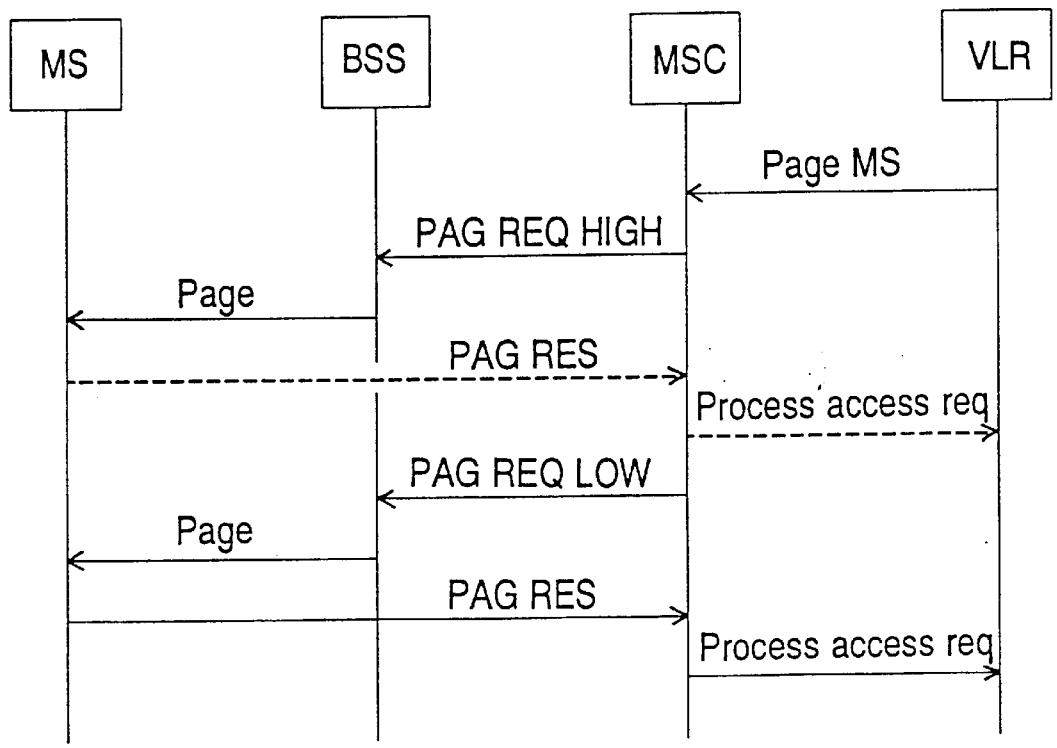
FIG. 6 is a signalling chart and FIG. 7 is a flow chart illustrating the paging procedure according to the invention.
Figure 7:
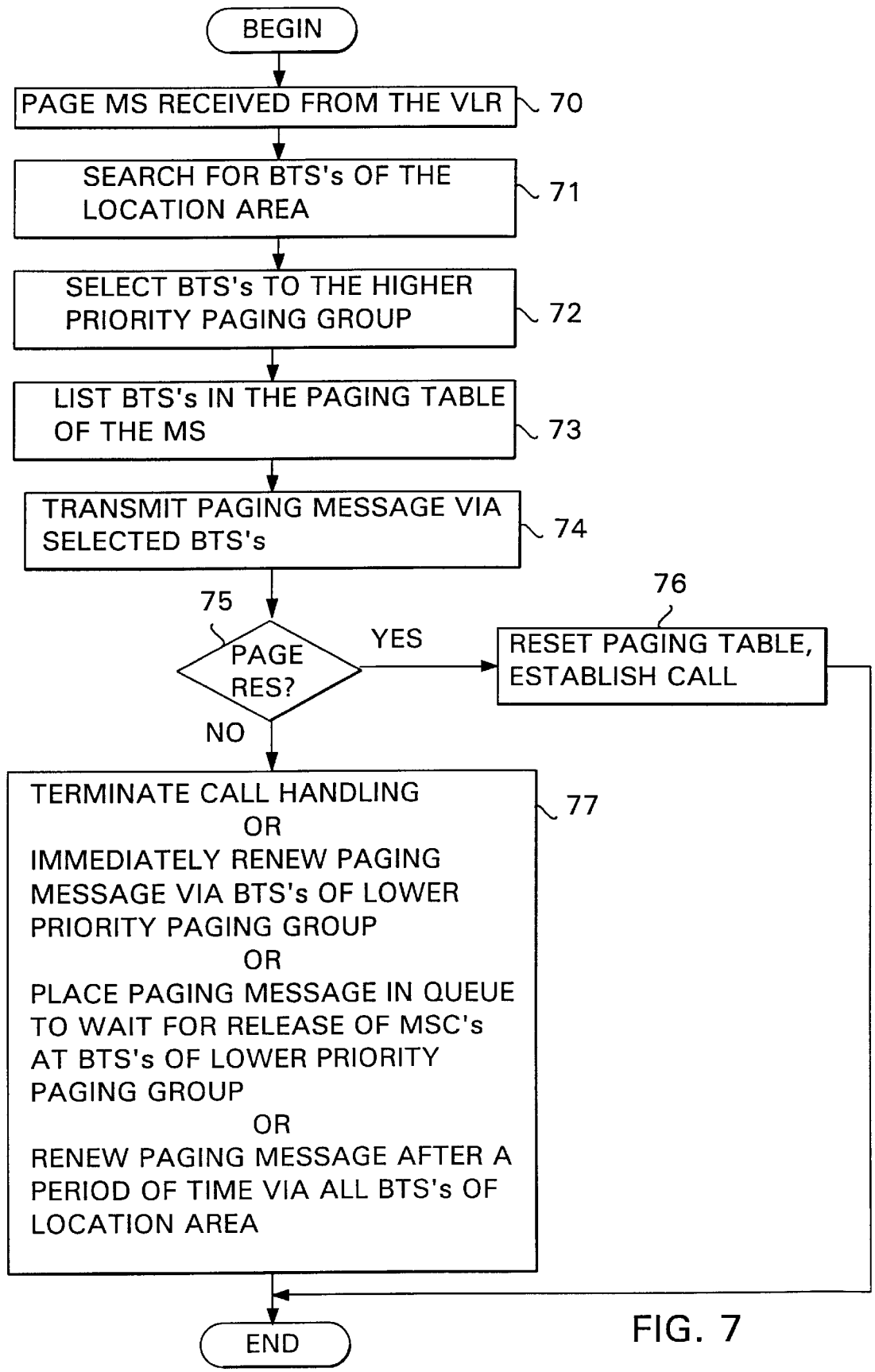
Figure 8:
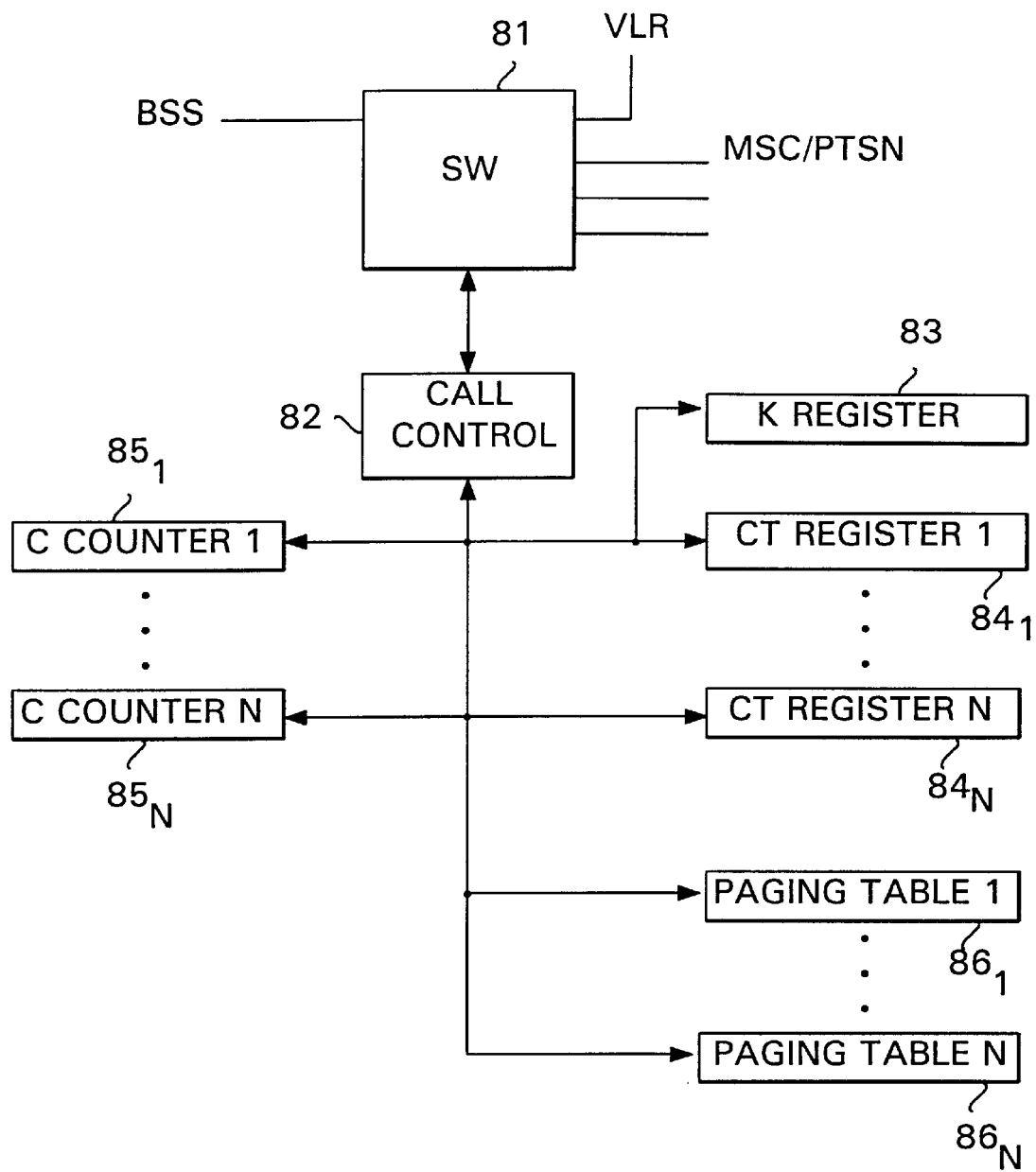
FIG. 8 is a block diagram of a mobile services switching centre performing the paging procedure according to the invention.

FIGS. 6 and 7 illustrate the paging procedure according to the invention in connection with a call intended for a mobile station MS. In FIG. 6, the visitor location register VLR initiates the paging of the MS by transmitting to the MSC a paging command PAGE MS, which contains at least the identifier of the mobile station MS and the location area in which the MS must be paged. The mobile services switching centre MSC then controls the subscriber paging according to the flow chart of FIG. 7. In step 70, the mobile services switching centre MSC receives the command PAGE MS from the visitor location register VLR. The MSC then searches in step 71 for the BTSs of the location area mentioned in the command and selects from among these the BTSs belonging to the higher priority paging group in step 72. In step 73, the selected BTSs are placed in the paging table 81 of the MS. The mobile services switching centre MSC then starts paging the mobile station MS on the radio path by transmitting to the base station system BSS a paging message PAG REQ HIGH, which contains at least the identifier of the MS and a list of the identifiers of BTSs classified in the higher paging group in the location area given. The base station controller BSC of the BSS transmits the paging message PAGE to the radio path via the BTSs in the list. Step 75 comprises waiting for the response PAG RES of the mobile station MS. If the response PAG RES is received in step 75 (broken line in FIG. 6), the process proceeds to step 76 where the paging table of the mobile station MS is reset and the call is established by transmitting a process access request to the visitor location register VLR.

In step 75, if the response message PAG RES is not received from the mobile station MS via a BTS belonging to the higher priority paging group, the process proceeds to step 77 where the call is further handled according to a selected strategy. Examples of alternative strategies include terminating the handling of the call, the immediate retransmission of the paging message via base stations of the lower priority paging group, and the retransmission of the paging message after a preset period of time via all the base stations. The signalling chart of FIG. 6 illustrates a case where the paging message is retransmitted immediately via the BTSs of the lower priority paging group. The MSC selects from the BTSs of the location area those stations that are not in the paging table 81 of the MS (i.e. through which the paging message has not yet been transmitted) and transmits the identifiers of these BTSs together with the identifiers of the MS to the base station system BSS in a paging message PAG REQ LOW. The base station controller BSC of the BSS transmits the paging message PAGE to the radio path via the BTSs given. The mobile station MS responds with the response message PAG RES on account of which the MSC initiates normal call establishment by transmitting a process access request to the BSC.

The figures and the description related thereto are only intended to illustrate the present invention. The details of the method and mobile communication system according to the invention may vary within the scope of the accompanying claims.

I claim:

1. A method for controlling subscriber paging messages in a mobile communication system comprising mobile stations, base stations, a mobile services switching center and a subscriber database maintaining information about the location of mobile stations, the method comprising:

grouping the base stations of a location area according to their traffic load, and transmitting a paging message for a mobile station first via lightly loaded base stations of the location area of the mobile station.

2. A method according to claim 1, further comprising retransmitting a paging message via more heavily loaded base stations of the location area of the mobile station than the lightly loaded base stations if the mobile station does not respond to the paging message transmitted via the lightly loaded base stations.

3. A method according to claim 1, further comprising placing the paging message in a queue to wait for the release of resources of more heavily loaded base stations of the mobile station location area than the lightly loaded base stations, if the mobile station does not respond to the paging message transmitted via the lightly loaded base stations.

4. A method according to claim 1, further comprising terminating call handling if the mobile station does not respond to the paging message transmitted via the lightly loaded base stations.

5. A method according to claim 1, further comprising:

placing base stations with a load that is lighter than or equal to a predetermined threshold value in a higher priority paging group, and placing base stations with a heavier load than said predetermined threshold value in a lower priority paging group.

6. A method according to claim 5, further comprising:

placing a base station in the higher priority paging group when a ratio between a number of traffic channels allocated to the base station and a number of traffic channels reserved at the base station is lower than or equal to a second predetermined threshold value, and placing a base station in the lower priority paging group when the ratio between the number of traffic channels allocated to the base station and the number of traffic channels reserved at the base station is higher than said second predetermined threshold value.

7. A method according to claim 5, wherein paging of the mobile station comprises:

searching for base stations of the location area of the mobile station, selecting from these base stations those base stations belonging to the higher priority paging group, transmitting a paging message to the mobile station via the selected base stations of the higher priority paging group, if a response is received from the mobile station, establishing a call, and if no response is received from the mobile station, placing the paging message in a queue, or retransmitting it either via the base stations of the lower priority paging group or via all the base stations of the location area.

8. A mobile communication system comprising mobile stations, base stations, a mobile services switching center and a subscriber database maintaining information about the location of mobile stations, wherein the base stations of the system are arranged according to their traffic load into paging groups with different priorities, so that base stations with a traffic load level lower than a predetermined threshold value have a higher priority in the selection of base stations for transmitting a paging message than base stations with a traffic load level higher than said threshold value.

9. A mobile communication system according to claim 8, further comprising:

means for monitoring a traffic load level individually for each base station, and means for comparing the traffic load level of each base station with said threshold value and for grouping the base stations.

10. A mobile communication system according to claim 9, wherein the means for monitoring the traffic load level comprise base-station-specific counters for counting the reserved traffic channels, the counters being incremented when a new traffic channel is reserved at the base station and decremented when a traffic channel is released at the base station.

11. A mobile communication system according to claim 10, wherein the comparing means comprise means for counting the ratio between the number of traffic channels allocated to the base station and the content of the traffic channel counter of the base station, and means for comparing the ratio to a predetermined threshold value, and means for grouping the base station to the higher priority paging group if said ratio is lower than or equal to a predetermined threshold value, or to the lower priority paging group if said ratio is higher than said predetermined threshold value.

* * * * *